US011889598B2

(12) United States Patent
Yang et al.

(10) Patent No.: US 11,889,598 B2
(45) Date of Patent: Jan. 30, 2024

(54) LED DIMMING CONTROL METHOD AND LED DIMMING DRIVING DEVICE

(71) Applicant: X-SIGNAL INTEGRATED CO., LTD., Beijing (CN)

(72) Inventors: Guanou Yang, Beijing (CN); Lingxin Kong, Beijing (CN)

(73) Assignee: X-SIGNAL INTEGRATED CO., LTD., Beijing (CN)

( * ) Notice: Subject to any disclaimer, the term of this patent is extended or adjusted under 35 U.S.C. 154(b) by 0 days.

(21) Appl. No.: 18/227,993

(22) Filed: Jul. 31, 2023

(65) Prior Publication Data

US 2023/0389145 A1 Nov. 30, 2023

Related U.S. Application Data

(63) Continuation of application No. PCT/CN2022/136046, filed on Dec. 2, 2022.

(30) Foreign Application Priority Data

Jan. 5, 2022 (CN) ......................... 202210003600.8

(51) Int. Cl.
*H05B 45/10* (2020.01)
*H05B 45/37* (2020.01)

(52) U.S. Cl.
CPC ............. *H05B 45/10* (2020.01); *H05B 45/37* (2020.01)

(58) Field of Classification Search
CPC ................................ H05B 45/10; H05B 45/37
See application file for complete search history.

(56) References Cited

U.S. PATENT DOCUMENTS

2012/0049048 A1* 3/2012 Dyer ......................... G01J 1/44 250/214 AL
2016/0078824 A1* 3/2016 Meador .............. H05B 45/3725 345/212

FOREIGN PATENT DOCUMENTS

| | | | |
|---|---|---|---|
| CN | 104091558 | A | 10/2014 |
| CN | 105392246 | A | 3/2016 |
| CN | 113015286 | A | 6/2021 |
| CN | 114302531 | A | 4/2022 |
| WO | 2013035177 | A1 | 3/2013 |

* cited by examiner

*Primary Examiner* — Minh D A
(74) *Attorney, Agent, or Firm* — Bayramoglu Law Offices LLC

(57) ABSTRACT

A light-emitting diode (LED) dimming driving device includes a digital-to-analog converter (DAC) control signal generating unit and an LED driving signal generating unit. The DAC control signal generating unit generates a first control signal and a second control signal. The first control signal is input to the LED driving signal generating unit to generate a first driving current $I_1$, and the second control signal is input to the LED driving signal generating unit to generate a second driving current $I_2$. The first driving current $I_1$ is less than a maximum power current value $I_{peak}$ corresponding to a peak power of the LED driving signal generating unit, and the second driving current $I_2$ is greater than the maximum power current value $I_{peak}$ corresponding to the peak power of the LED driving signal generating unit.

8 Claims, 6 Drawing Sheets

LED DIMMING CONTROL METHOD AND LED DIMMING DRIVING DEVICE

CROSS REFERENCE TO THE RELATED APPLICATIONS

This application is the continuation application of International Application No. PCT/CN2022/136046, filed on Dec. 2, 2022, which is based upon and claims priority to Chinese Patent Application No. 202210003600.8, filed on Jan. 5, 2022, the entire contents of which are incorporated herein by reference.

TECHNICAL FIELD

The present invention relates to the field of light-emitting diode (LED) dimming driving technology and in particular to an LED dimming control method and an LED dimming driving device.

BACKGROUND

LED backlight has advantages of long life, low power consumption and environmental protection, etc., and is widely used in the backlight source occasions. As applications are more and more widely, the design of its driving circuit becomes more important. PWM (Pulse Width Modulation) dimming is currently a mainstream dimming technology used in LED dimming products. In the analog signal circuit, the brightness change of the LED is controlled by digital output. Compared with the traditional analog signal dimming, this modulation method has many advantages, but it also has certain disadvantages at the same time, that is, there is only one non-zero stable point in PWM, which will cause the following problems in the process of modulating the LED current. (1) The difference between the rising and falling waveforms has a certain impact on the accuracy. (2) Repeated switching of the LED has a great impact on the input and output system, and it is easy to generate parasitic inductance on the line, causing oscillation problems. (3) When the output level is too high, the device will overheat and shorten the service life. The present invention aims at the problem that the current LED backlight modulation has only one non-zero stable point, and proposes a method for modulating the LED backlight by using a digital-to-analog converter (DAC) to output multiple stable point control signals. DAC can control multiple stable output points in a very short time, and use the low-pass effect to achieve the output with control accuracy. At the same time, the output signals for multiple stable points are encoded to achieve the output with higher accuracy. There is no impact of repeated switching on the input and output system, and the abnormal output point is fitted to obtain the required output, and the problem of the device overheating caused by excessive output voltage is solved, prolonging the service life.

SUMMARY

One of the technical problems to be solved by the present invention is to achieve an LED light-emitting element which has multiple stable output points when dimming, and simultaneously eliminates the voltage and current impact of repeated switching on the LED drive system under the PWM dimming, further reducing the working power of the LED drive controlling circuit itself.

In order to solve the above technical problem(s), the present invention provides an LED dimming control method. The LED dimming control method includes:

controlling, by an LED dimming driving device comprising a DAC control signal generating unit and an LED driving signal generating unit, a working current of an LED light-emitting element;

generating, from the DAC control signal generating unit, a first control signal and a second control signal, wherein the first control signal is input to the LED driving signal generating unit to generate a first driving current $I_1$, the second control signal is input to the LED driving signal generating unit to generate a second driving current $I_2$, the first driving current $I_1$ is less than a maximum power current value $I_{peak}$ corresponding to a peak power of the LED driving signal generating unit, the second driving current $I_2$ is greater than the maximum power current value $I_{peak}$ corresponding to the peak power of the LED driving signal generating unit.

If a clock cycle time length of the control signal generated by the DAC control signal generating unit is T, a first control signal duration is $T_1$ and a second control signal duration is $T_2$ within every clock cycle, then $T_1+T_2=T$.

By adjusting the first control signal duration $T_1$ and the second control signal duration $T_2$, an adjustment of a light-emitting brightness of the LED light-emitting assembly can be realized.

In one embodiment, the DAC control signal generating unit generates a third control signal, wherein the third control signal is input to the LED driving signal generating unit to generate a third driving current $I_3$, the third driving current $I_3$ is greater than the maximum power current value $I_{peak}$, and the second driving current $I_2$ is greater than the third driving current $I_3$.

In one embodiment, the DAC control signal generating unit further generates a plurality of first sub-control signals, wherein the plurality of first sub-control signals are output from the DAC control signal generating unit when a transition occurs between the first control signal and the second control signal.

In one embodiment, the DAC control signal generating unit further generates a plurality of second sub-control signals, wherein the plurality of second sub-control signals are superposed on the first control signal or the second control signal.

In one embodiment, the first driving current $I_1$ generated by the LED driving signal generating unit is non-zero.

The present invention further provides an LED dimming driving device. The LED dimming driving device includes a DAC control signal generating unit and an LED driving signal generating unit.

The DAC control signal generating unit generates a first control signal and a second control signal, wherein the first control signal is input to the LED driving signal generating unit to generate a first driving current $I_1$, the second control signal is input to the LED driving signal generating unit to generate a second driving current $I_2$, the first driving current $I_1$ is less than a maximum power current value $I_{peak}$ corresponding to a peak power of the LED driving signal generating unit, the second driving current $I_2$ is greater than the maximum power current value $I_{peak}$ corresponding to the peak power of the LED driving signal generating unit.

If a clock cycle time length of the control signal generated by the DAC control signal generating unit is T, a first control signal duration is $T_1$ and a second control signal duration is $T_2$ within every clock cycle, then $T_1+T_2=T$.

By adjusting the first control signal duration $T_1$ and the second control signal duration $T_2$, an adjustment of a light-emitting brightness of the LED light-emitting assembly can be realized.

In one embodiment, the DAC control signal generating unit further generates a third control signal, wherein the third control signal is input to the LED driving signal generating unit to generate a third driving current $I_3$, the third driving current $I_3$ is greater than the maximum power current value $I_{peak}$, and the second driving current $I_2$ is greater than the third driving current $I_3$.

In one embodiment, the DAC control signal generating unit further generates a plurality of first sub-control signals, wherein the plurality of first sub-control signals are output from the DAC control signal generating unit when a transition occurs between the first control signal and the second control signal.

In one embodiment, the DAC control signal generating unit further generates a plurality of second sub-control signals, wherein the plurality of second sub-control signals are superposed on the first control signal or the second control signal.

In one embodiment, the first driving current $I_1$ generated by the LED driving signal generating unit is non-zero.

Compared with prior art, embodiment(s) of the present invention can have following advantage.

1. In the present invention, first control signal and second control signal are generated by DAC control signal generating unit, and the over-stable point output of LED dimming is realized by adjusting the durations of first control signal and second control signal, and each stable point corresponds to the first-level brightness of the LED.
2. In the present invention, the first driving current $I_1$ generated by the first control signal is non-zero current, which realizes that the LED is always in the switch-on state, thereby avoiding the repeatedly switching working state of the LED drive system, and reducing the voltage and current impact on the LED drive system.
3. In the present invention, the third control signal is generated by the DAC control signal generating unit, and the more accurate brightness adjustment of the LED in the high brightness input state is realized by adjusting the third control signal.
4. In the present invention, a plurality of sub-control signals are generated by the DAC control signal generating unit, thereby reducing the voltage or current impact resulted from the jumping of the first control signal into the second control signal or the jumping of the second control signal into the first control signal.

Other features and advantages of the present invention will be set out in the subsequent specification and, in part, become apparent from the specification or are understood by implementing the invention. The objects and other advantages of the present invention may be achieved and obtained by means of the structures indicated in particular in the specification, the claims and the accompanying drawings.

BRIEF DESCRIPTION OF THE DRAWINGS

The accompanying drawings are used to provide a further understanding of the present invention and form part of the specification and, together with the embodiments of the invention, are used to explain the invention and do not constitute a limitation of the invention, in which.

DETAILED DESCRIPTION OF THE EMBODIMENTS

In order to make the object(s), technical solutions and advantages of the present invention clearer, the present invention is further described in detail hereinafter in conjunction with FIGS. 1 to 6 of the accompanying drawings.

First Embodiment

Figure 1:
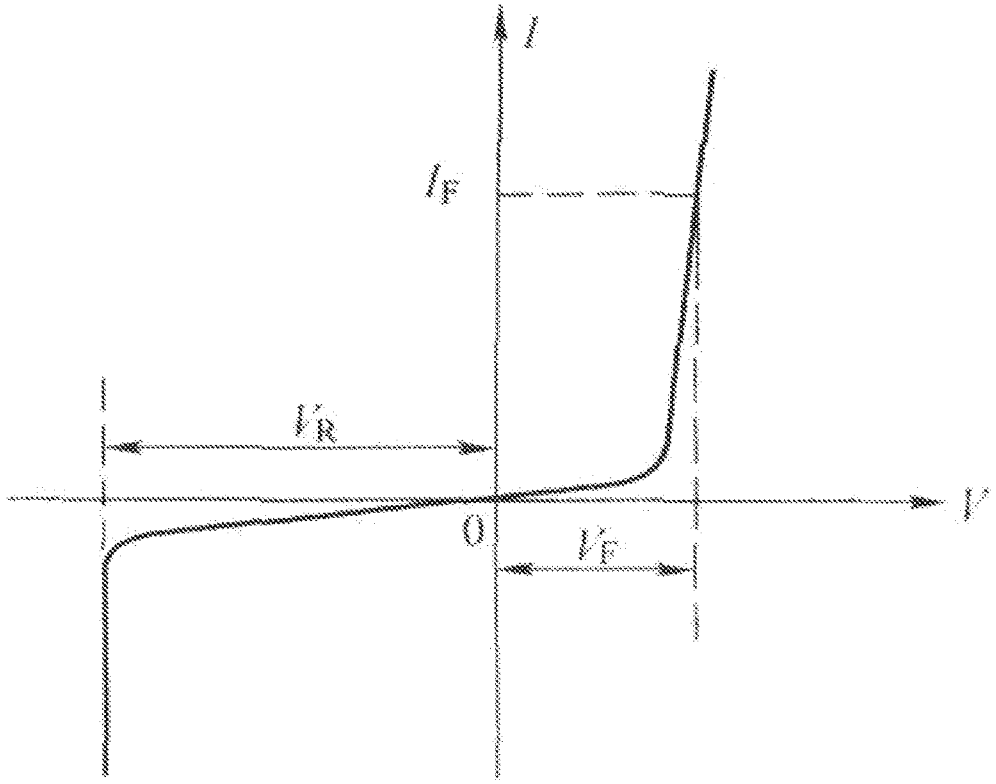
FIG. 1 is a voltammetric characteristic curve of the LED.
Figure 2:
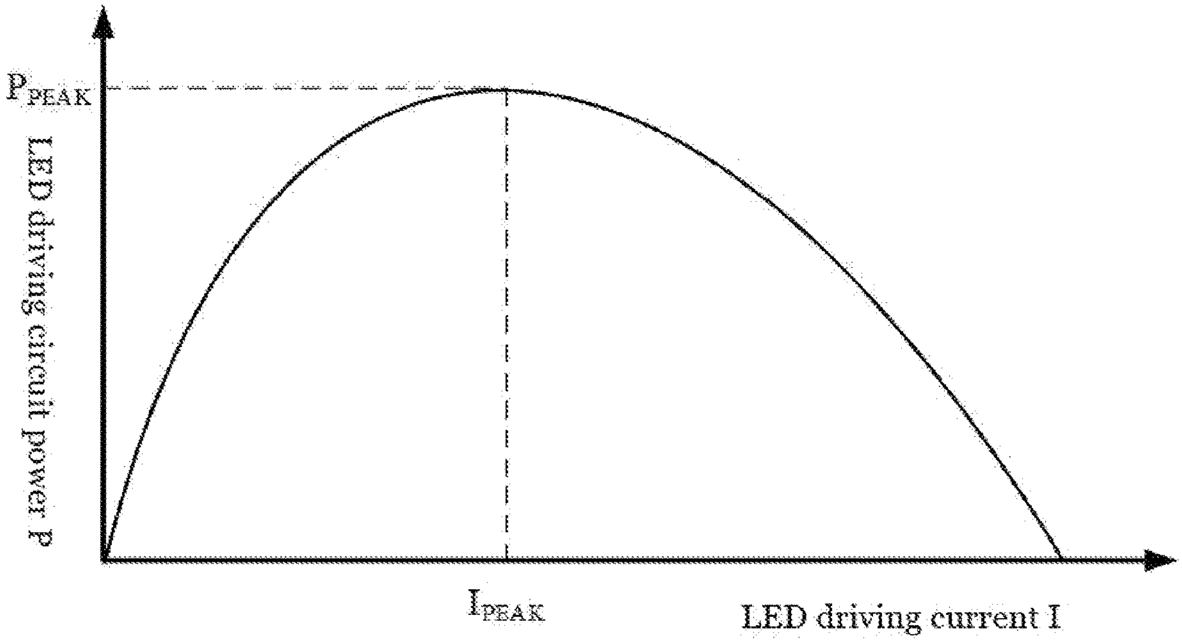
FIG. 2 is a curve of the relationship between the power and the current of the LED.
Figure 3:
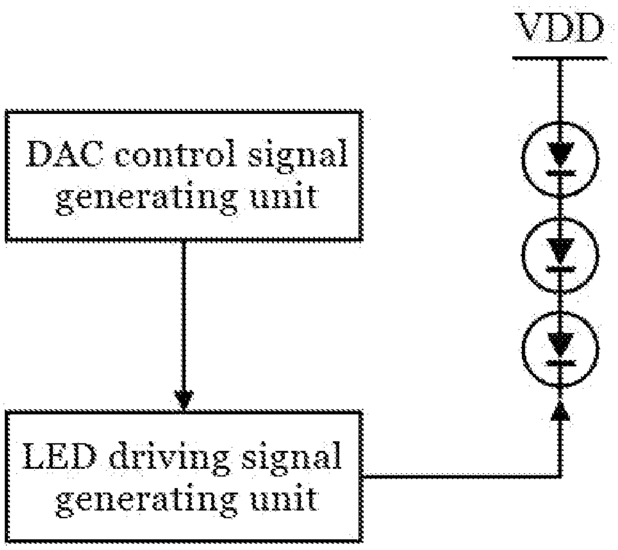
FIG. 3 is a structural schematic diagram of an LED dimming driving device according to the present invention.

As shown in FIG. 3, the LED dimming driving device in this embodiment includes a DAC control signal generating unit and an LED driving signal generating unit.

Figure 4:
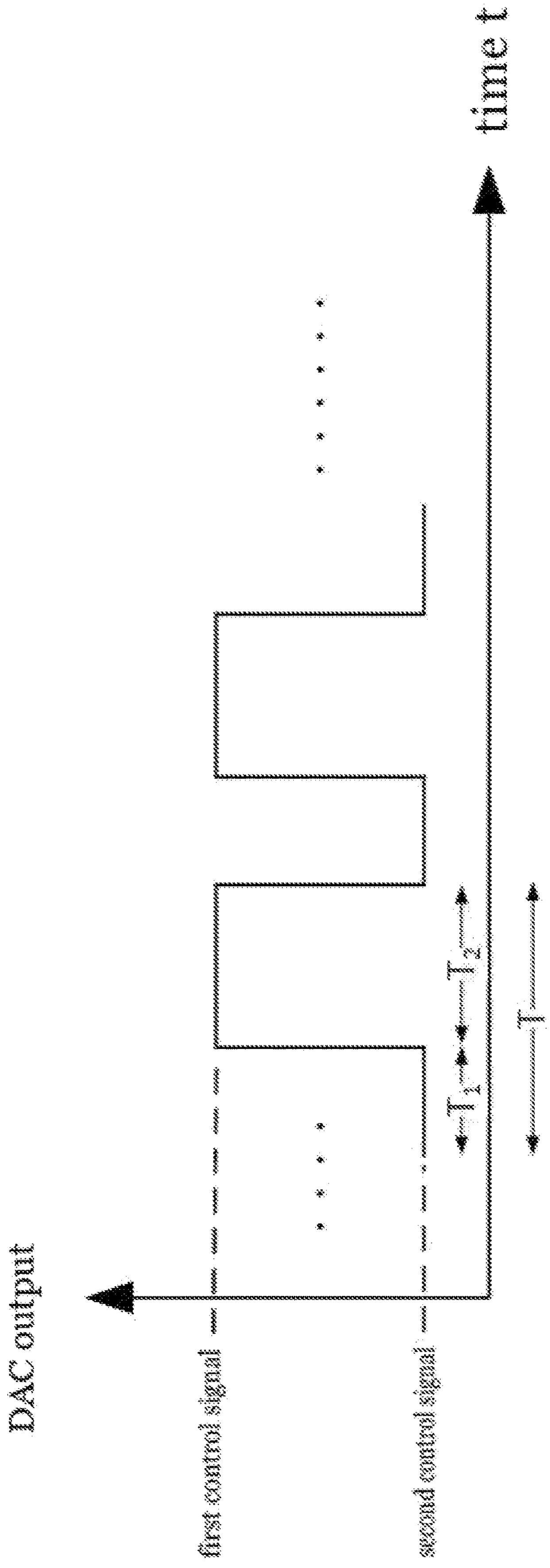
FIG. 4 is a schematic diagram of a control signal clock according to a first embodiment of the present invention.

As shown in FIG. 4, the DAC control signal generating unit generates a first control signal and a second control signal, the first control signal is input to the LED driving signal generating unit to generate a first driving current $I_1$, the second control signal is input to the LED driving signal generating unit to generate a second driving current $I_2$, the first driving current $I_1$ is less than a maximum power current value $I_{peak}$ corresponding to a peak power of the LED driving signal generating unit, and the second driving current $I_2$ is greater than the maximum power current value $I_{peak}$ corresponding to the peak power of the LED driving signal generating unit. The first driving current $I_1$ and the second driving current $I_2$ are the driving current flowing through the LED light-emitting assembly.

If a clock cycle time length of the control signal generated by the DAC control signal generating unit is T, and a first control signal duration is $T_1$ and a second control signal duration is $T_2$ within every clock cycle, then $T_1+T_2=T$. That is, the control signals generated by the DAC control signal generating unit assume to jump from the first control signal to the second control signal within each cycle. Meanwhile, both the first driving current $I_1$ and the second driving current $I_2$ generated by the LED driving signal generating unit assume to jump from the first driving current $I_1$ to the second driving current $I_2$ within each cycle. Then, an average LED driving current $I_{ave}$ generated by the LED driving signal generating unit can be expressed as:

$$I_{ave} = I_1 \cdot \frac{T_1}{T} + I_2 \cdot \frac{T_2}{T}.$$

In this embodiment, when the LED dimming driving device adopts a voltage type driving mode, both the first control signal and the second control signal generated by the DAC control signal generating unit are voltage signals. When the LED dimming driving device adopts a current type driving mode, both the first control signal and the second control signal generated by the DAC control signal generating unit are current signals.

By adjusting the first control signal duration T1 and the second control signal duration T2, an adjustment of the power regulation of LED driving signal generation unit can be realized, so that an adjustment of a brightness of the LED light-emitting assembly can be realized. For example, in case that the maximum power current value $I_{peak}$ is 100 mA, the first driving current $I_1$ is set to 40 mA, and the second driving current $I_2$ is set to 200 mA. When the first control signal duration $T_1$ is set to 5T/8, and the second control signal duration is 3T/8, it can be realized that the brightness output by the LED light-emitting assembly is the same as the brightness when the LED drive signal generating unit outputs the maximum power current value $I_{peak}$. Further, when the first control signal duration $T_1$ increases and the second control signal duration $T_2$ decreases, the brightness output by the LED light-emitting assembly decreases. In this embodiment, eight groups of different first control signal durations $T_1$ and second control signal durations $T_2$ can be selected according to the power curve of the LED so as to realize the adjustment of eight different brightness levels of the LED light-emitting assembly.

According to the above-mentioned dimming method of the present embodiment, since the first driving current $I_1$ and the second driving current $I_2$ are none-zero, the LED is always in the switch-on state. Compared with the PWM dimming method, it avoids the repeatedly switching working state of the LED, thereby reducing the voltage impact on the drive system and improving the stability of the drive system. As for the LED dimming driving device, the above-mentioned eight groups of different first control signal durations $T_1$ and second control signal durations $T_2$ are stable output points. Compared with the PWM dimming method, it has higher control accuracy.

On the other hand, since the LED driving signal generating unit with the first driving current $I_1$ and the second driving current $I_2$ is always in a low-power operating state, the power value of the LED driving signal generating unit can be greatly reduced, and the thermal value of the LED driving signal generating unit can be reduced.

Second Embodiment

This embodiment is a further improvement to the above-mentioned first embodiment. The LED dimming driving device in this embodiment includes a DAC control signal generating unit and an LED driving signal generating unit.

Figure 5:
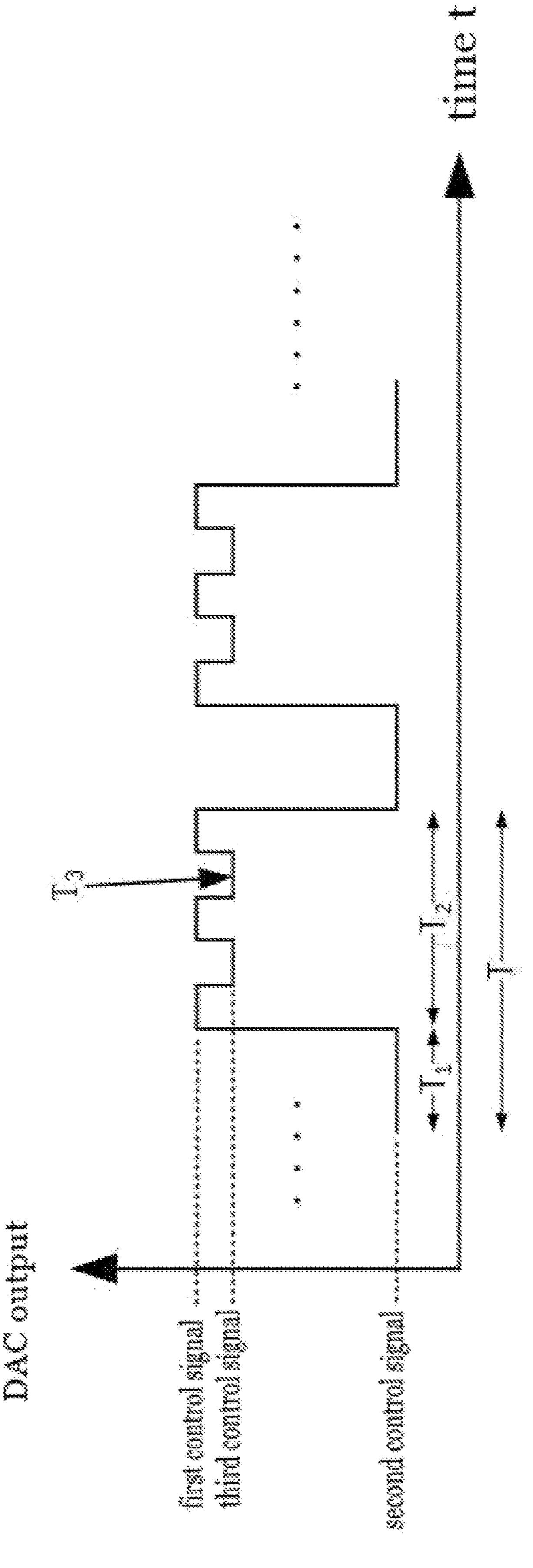
FIG. 5 is a schematic diagram of a control signal clock according to a second embodiment of the present invention.

As shown in FIG. 5, the DAC control signal generating unit generates a first control signal, a second control signal and a third control signal, the first control signal is input to the LED driving signal generating unit to generate a first driving current $I_1$, the second control signal is input to the LED driving signal generating unit to generate a second driving current $I_2$, the third control signal is input to the LED driving signal generating unit to generate a third driving current $I_3$.

The first driving current $I_1$ is less than a maximum power current value $I_{peak}$ corresponding to a peak power of the LED driving signal generating unit, and the second driving current $I_2$ and the third driving current $I_3$ are greater than the maximum power current value $I_{peak}$ corresponding to the peak power of the LED driving signal generating unit. Further, the second driving current $I_2$ is greater than the third driving current $I_3$.

The first driving current $I_1$, the second driving current $I_2$ and the third driving current $I_3$ are driving currents flowing through the LED light-emitting assembly.

If a clock cycle time length of the control signal generated by the DAC control signal generating unit is T, and a first control signal duration is $T_1$ and a second control signal duration is $T_2$ and a third control signal duration is $T_3$ within every clock cycle, then $T_1+T_2+T_3=T$. That is, the control signals generated by the DAC control signal generating unit assume to jump among the first control signal, the second control signal and the third control signal within each cycle. Meanwhile, all the first driving current $I_1$ and the second driving current $I_2$ and the third driving current $I_3$ generated by the LED driving signal generating unit assume to jump among the first driving current $I_1$ and the second driving current $I_2$ and the third driving current $I_3$ within each cycle. Then, an average LED driving current $I_{ave}$ flowing through the LED light-emitting assembly can be expressed as:

$$I_{ave} = I_1 \cdot \frac{T_1}{T} + I_2 \cdot \frac{T_2}{T} + I_3 \cdot \frac{T_3}{T}.$$

In this embodiment, when the LED dimming driving device adopts a voltage type driving mode, all the first control signal and the second control signal and the third control signal generated by the DAC control signal generating unit are voltage signals. When the LED dimming driving device adopts a current type driving mode, all the first control signal and the second control signal and the third control signal generated by the DAC control signal generating unit are current signals.

In this embodiment, on the basis of adjusting the first control signal duration $T_1$ and the second control signal duration $T_2$ in the first embodiment, the adjustment of the third control signal duration $T_1$ is further added, thereby improving the accuracy of dimming the LED light-emitting assembly. For example, in case that the maximum power current value $I_{peak}$ is 100 mA, the first driving current $I_1$ is set to 40 mA, and the second driving current $I_2$ is set to 200 mA, and the third driving current $I_3$ is set to 190 mA. By controlling the third control signal duration $T_3$, an brightness level of the LED light-emitting assembly close to the brightness of the output peak power of the LED driving signal generating unit can be added, and the third control signal duration $T_3$ determines the brightness value of the LED light-emitting assembly at this brightness level.

In this embodiment, there is an improved solution, that is, the third driving current $I_3$ generated by driving the third control signal can be set to be less than the maximum power current value $I_{peak}$ corresponding to the peak power of the LED driving signal generating unit, and the third driving current $I_3$ is greater than the second driving current $I_2$. In this way, similarly, an brightness level of the LED light-emitting assembly close to the brightness of the output peak power of the LED driving signal generating unit can be added, and the third control signal duration $T_1$ determines the brightness value of the LED light-emitting assembly at this brightness level.

Third Embodiment

This embodiment is a further improvement to the above-mentioned first embodiment. The LED dimming driving device in this embodiment includes a DAC control signal generating unit and an LED driving signal generating unit.

Figure 6:
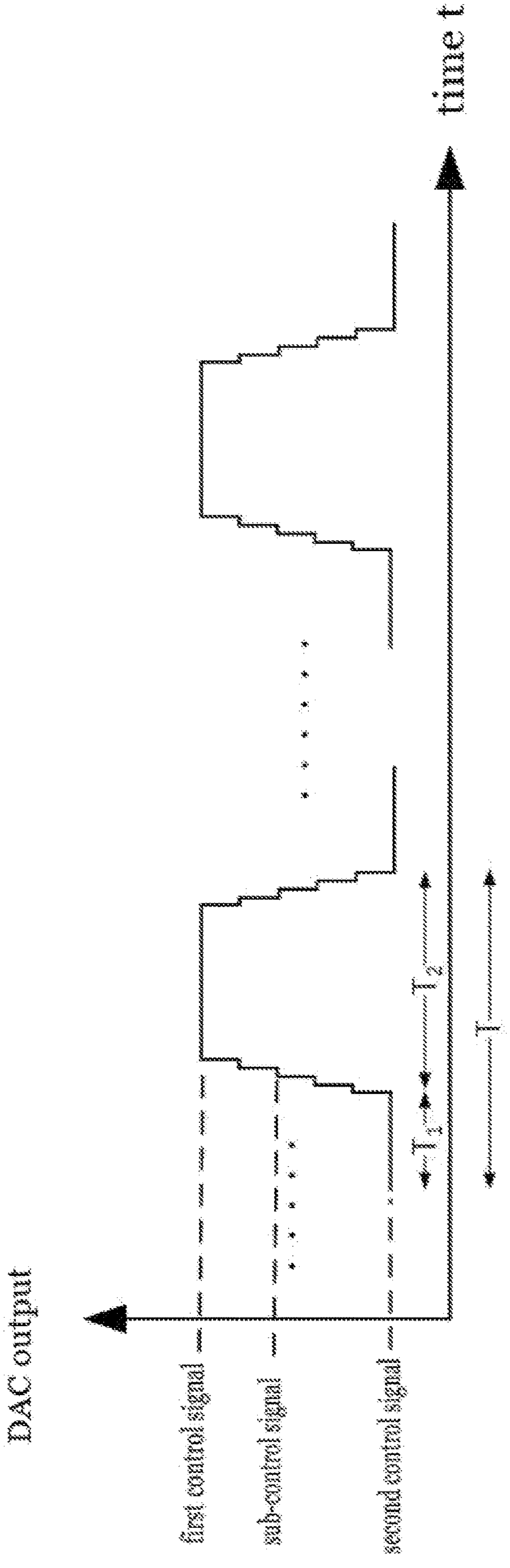
FIG. 6 is a schematic diagram of a control signal clock according to a third embodiment of the present invention.

As shown in FIG. 6, the DAC control signal generating unit generates a first control signal and a second control signal, the first control signal is input to the LED driving signal generating unit to generate a first driving current $I_1$, the second control signal is input to the LED driving signal generating unit to generate a second driving current $I_2$, the first driving current $I_1$ is less than a maximum power current value $I_{peak}$ corresponding to a peak power of the LED driving signal generating unit, and the second driving current $I_2$ is greater than the maximum power current value $I_{peak}$ corresponding to the peak power of the LED driving signal generating unit. The first driving current $I_1$ and the second driving current $I_2$ are driving currents flowing through the LED light-emitting assembly.

If a clock cycle time length of the control signal generated by the DAC control signal generating unit is T, and a first control signal duration is $T_1$ and a second control signal duration is $T_2$ within every clock cycle, then $T_1+T_2=T$. That is, the control signals generated by the DAC control signal generating unit assume to jump from the first control signal to the second control signal within each cycle. Meanwhile, both the first driving current $I_1$ and the second driving current $I_2$ generated by the LED driving signal generating unit assume to jump from the first driving current $I_1$ to the second driving current $I_2$ within each cycle. Then, an average LED driving current $I_{ave}$ flowing through the LED light-emitting assembly can be expressed as:

$$I_{ave} = I_1 \cdot \frac{T_1}{T} + I_2 \cdot \frac{T_2}{T}.$$

In this embodiment, when the control signal generated by the DAC control signal generating unit jumps from the first control signal to the second control signal, or jumps from the second control signal to the first control signal, in order to reduce the voltage or current impact caused by the signal mutation, N first sub-control signals are added when a transition occurs between the first control signal and second control signal, N is an integer greater than 0, that is, a first sub-control signal 1, a first sub-control signal 2, . . . , a first sub-control signal n, . . . , a first sub-control signal N. After adding the N first sub-control signals, when the first control signal is transited to the second control signal, the DAC control signal generating unit outputs the first control signal, the N first sub-control signals, and the second control signal in sequence. In this way, a smooth control of the jumping from the first control signal to the second control signal is realized. Similarly, when the second control signal is converted to the first control signal, the DAC control signal generating unit outputs the second control signal, the N first sub-control signals, and the first control signal in sequence. In this way, a smooth control of the jumping from the second control signal to the first control signal is realized.

In this embodiment, the smooth driving current generated by the first sub-control signal and the duration of each first sub-control signal can be adjusted according to the circuit characteristics of the LED driving signal generating unit.

One optional embodiment is that, after the $n^{th}$ first sub-control signal n is input to the LED driving signal generating unit, the smooth driving current in is generated. Then, the relationship between a smooth driving current $i_n$, a first driving current $i_1$ and a second driving current $i_2$ is expressed as:

$$i_n = I_1 + n \cdot \frac{I_2 - I_1}{N + 1}.$$

That is, the N smooth driving currents corresponding to the N first sub-control signals increase with the same gradient, and the durations of the N first sub-control signals are all the same. At the same time, the adjustment is made according to the signal smoothing effect, that is, when the signal smoothing effect is poor, the duration of each first sub-control signal can be appropriately increased.

In this embodiment, the purpose of adding the N first sub-control signals is to smooth the signal peak generated when the first driving current $I_1$ jumps to the second driving current $I_2$.

Fourth Embodiment

This embodiment is a further improvement to the above-mentioned first embodiment. The LED dimming driving device in this embodiment includes a DAC control signal generating unit and an LED driving signal generating unit.

Figure 7:
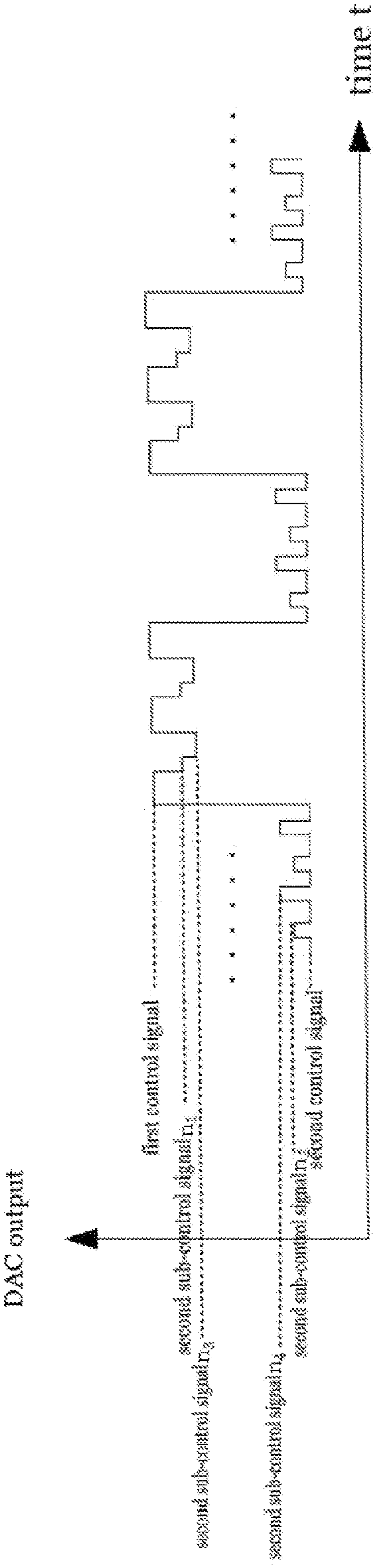
FIG. 7 is a schematic diagram of a control signal clock according to a fourth embodiment of the present invention.

As shown in FIG. 7, the DAC control signal generating unit generates a first control signal and a second control signal, the first control signal is input to the LED driving signal generating unit to generate a first driving current $I_1$, the second control signal is input to the LED driving signal generating unit to generate a second driving current $I_2$, the first driving current $I_1$ is less than a maximum power current value $I_{peak}$ corresponding to a peak power of the LED driving signal generating unit, and the second driving current $I_2$ is greater than the maximum power current value $I_{peak}$ corresponding to the peak power of the LED driving signal generating unit. The first driving current $I_1$ and the second driving current $I_2$ are driving currents flowing through the LED light-emitting assembly.

If a clock cycle time length of the control signal generated by the DAC control signal generating unit is T, and a first control signal duration is $T_1$ and a second control signal duration is $T_2$ within every clock cycle, then $T_1+T_2=T$. That is, the control signals generated by the DAC control signal generating unit assume to jump from the first control signal to the second control signal within each cycle. Meanwhile, both the first driving current $I_1$ and the second driving current $I_2$ generated by the LED driving signal generating unit assume to jump from the first driving current $I_1$ to the second driving current $I_2$ within each cycle. Then, an average LED driving current $I_{ave}$ flowing through the LED light-emitting assembly can be expressed as:

$$I_{ave} = I_1 \cdot \frac{T_1}{T} + I_2 \cdot \frac{T_2}{T}.$$

In this embodiment, when the control signal generated by the DAC control signal generating unit outputs the first control signal or the second control signal, N second sub-control signals are superposed on the first control signal and the second control signal.

In this embodiment, the second sub-control signal 1 to the second sub-control signal $n_1$ are superposed on the first control signal, and at the same time, the second sub-control signal i to the second sub-control signal $n_2$ are superposed on the first control signal, and $n_1+n_2=N$. The amplitude and duration of the plurality of second sub-control signals can be adjusted according to brightness accuracy of the output required by the LED light-emitting assembly. When the LED light-emitting component requires more brightness levels, that is, the higher is the accuracy of the brightness level, the more is the number of the sub-control signals. The amplitude and duration of each second sub-control signal can be adjusted according to accuracy of the brightness levels of the LED light-emitting component to be formed.

According to this embodiment, the LED dimming driving device of the present invention achieves more accurate brightness levels of the output by applying the second sub-control signals on the basis that the brightness levels of the LED are adjusted by adjusting the amplitudes and durations of the first control signal and the second sub-control signal.

The above described is/are only specific implementation(s) of the present invention, the scope of protection of the present invention is not limited to this, and any modification or replacement of the present invention by any person skilled in the art within the technical specifications described herein shall be within the scope of protection of the present invention.

What is claimed is:

1. A light-emitting diode (LED) dimming control method, comprising:

controlling, by an LED dimming driving device comprising a digital-to-analog converter (DAC) control signal generating unit and an LED driving signal generating unit, a working current of an LED light-emitting element;

generating, from the DAC control signal generating unit, a first control signal and a second control signal, wherein the first control signal is input to the LED driving signal generating unit to generate a first driving current $I_1$, the second control signal is input to the LED driving signal generating unit to generate a second driving current $I_2$, the first driving current is less than a maximum power current value $I_{peak}$ corresponding to a peak power of the LED driving signal generating unit, the second driving current $I_2$ is greater than the maximum power current value $I_{peak}$ corresponding to the peak power of the LED driving signal generating unit, the LED driving signal generating unit with the first driving current $I_1$ and the second driving current $I_2$ are both in a low-power operating state, and the first driving current $I_1$ generated by the LED driving signal generating unit is non-zero; and adjusting a first control signal duration and a second control signal duration to realize eight stable output points of LED dimming, wherein each stable point corresponds to different levels of LED brightness.

2. The LED dimming control method according to claim 1, comprising:

generating, from the DAC control signal generating unit, a third control signal, wherein the third control signal is input to the LED driving signal generating unit to generate a third driving current $I_3$, the third driving current $I_3$ is greater than the maximum power current value and the second driving current $I_2$ is greater than the third driving current $I_3$.

3. The LED dimming control method according to claim 1, comprising:

further generating, from the DAC control signal generating unit, a plurality of first sub-control signals, wherein the plurality of first sub-control signals are output from the DAC control signal generating unit when a transition occurs between the first control signal and the second control signal.

4. The LED dimming control method according to claim 1, comprising:

further generating, from the DAC control signal generating unit, a plurality of second sub-control signals, wherein the plurality of second sub-control signals are superposed on the first control signal or the second control signal.

5. An LED dimming driving device, comprising a DAC control signal generating unit and an LEI) driving signal generating unit;

wherein the DAC control signal generating unit generates a first control signal and a second control signal, wherein the first control signal is input to the LED driving signal generating unit to generate a first driving current $I_1$, the second control signal is input to the LED driving signal generating unit to generate a second driving current $I_2$, the first driving current $I_1$ is less than a maximum power current value $I_{peak}$ corresponding to a peak power of the LED driving signal generating unit, the second driving current $I_1$ is greater than the maximum power current value $I_{peak}$ corresponding to the peak power of the LED driving signal generating unit, and the LED driving signal generating unit with the first driving current $I_1$ and the second driving current k are both in a low-power operating state;

the first driving current $I_1$ generated by the LED driving signal generating unit is non-zero; and a first control signal duration and a second control signal duration are adjusted to realize eight stable output points of LED dimming, wherein each stable point corresponds to different levels of LED brightness.

6. The LED dimming driving device according to claim 5, wherein, the DAC control signal generating unit further generates a third control signal, wherein the third control signal is input to the LED driving signal generating unit to generate a third driving current $I_3$, the third driving current $I_3$ is greater than the maximum power current value $I_{peak}$, and the second driving current $I_2$ is greater than the third driving current L.

7. The LED dimming driving device according to claim 5, wherein, the DAC control signal generating unit further generates a plurality of first sub-control signals, wherein the plurality of first sub-control signals are output from the DAC control signal generating unit when a transition occurs between the first control signal and the second control signal.

8. The LED dimming driving device according to claim 5, wherein, the DAC control signal generating unit further generates a plurality of second sub-control signals, wherein the plurality of second sub-control signals are superposed on the first control signal or the second control signal.

* * * * *